(12) United States Patent
Slaney

(10) Patent No.: US 6,173,260 B1
(45) Date of Patent: Jan. 9, 2001

(54) SYSTEM AND METHOD FOR AUTOMATIC CLASSIFICATION OF SPEECH BASED UPON AFFECTIVE CONTENT

(75) Inventor: Malcolm Slaney, Los Altos, CA (US)

(73) Assignee: Interval Research Corporation, Palo Alto, CA (US)

( * ) Notice: Under 35 U.S.C. 154(b), the term of this patent shall be extended for 0 days.

(21) Appl. No.: 09/050,896

(22) Filed: Mar. 31, 1998

Related U.S. Application Data

(60) Provisional application No. 60/063,705, filed on Oct. 29, 1997.

(51) Int. Cl.[7] .................................................. G10L 15/08

(52) U.S. Cl. .......................................... 704/250; 704/231

(58) Field of Search ................................. 704/231, 236, 704/243, 246, 250, 255, 276

(56) References Cited

U.S. PATENT DOCUMENTS

| 3,855,417 | 12/1974 | Fuller ................................... 704/272 |
| 4,490,840 | * 12/1984 | Jones ..................................... 704/276 |
| 5,537,647 | 7/1996 | Hermansky et al. ................. 704/211 |
| 5,598,505 | 1/1997 | Austin et al. ......................... 704/226 |
| 5,774,850 | 6/1998 | Hattori et al. ........................ 704/250 |

OTHER PUBLICATIONS

R. Cowie, M. Sawey, and E. Douglas–Cowie, "A New Speech Analysis System: ASSESS (Automatic Statistical Summary of Elementary Speech Structures)," Proc. 13th Int. Cong of Phonetic Sciences, ICPhs 95, Stockholm, Sweden, Aug. 13–19, 1995, pp. 278–281.*

Chen, Lawrence S. et al, "*Multimodal Human Emotion/Expression Recognition*", Third IEEE International Conference on Automatic Face and Gesture Recognition, Apr. 14–16, 1998, pp. 366–371.

Rabiner, Lawrence R., "*Distortion Measures—Perceptual Considerations*", Fundamentals of Speech Recognition, 1993, pp. 150–200.

Rabiner, Lawrence R., "*Linear Predictive Coding of Speech*", Digital Processing of Speech Signals, 1978, pp. 396–461.

Roy, Deb et al, "*Automatic Spoken Affect Classification and Analysis*", Proceedings of the Second International Conference on Automatic Face and Gesture Recognition, Oct. 14–16, 1996, pp. 363–367.

Slaney, Malcolm et al, "*Baby Ears: A recognition System for Affective Vocalizations*", Proceedings of the 1998 IEEE International Conference on Acoustics, Speech and Signal Processing, May 12–15, 1998, pp. 985–988.

(List continued on next page.)

*Primary Examiner*—David R. Hudspeth
*Assistant Examiner*—Donald L. Storm
(74) *Attorney, Agent, or Firm*—Burns, Doane, Swecker & Mathis, L.L.P.

(57) ABSTRACT

The classification of speech according to emotional content employs acoustic measures in addition to pitch as classification input. In one embodiment, two different kinds of features in a speech signal are analyzed for classification purposes. One set of features is based on pitch information that is obtained from a speech signal, and the other set of features is based on changes in the spectral shape of the speech signal over time. This latter feature is used to distinguish long, smoothly varying sounds from quickly changing sound, which may indicate the emotional state of the speaker. These changes are determined by means of a low-dimensional representation of the speech signal, such as MFCC or LPC. Additional features of the speech signal, such as energy, can also be employed for classification purposes. Different variations of pitch and spectral shape features can be measured and analyzed, to assist in the classification of individual utterances. In one implementation, the features are measured individually for each of the first, middle and last thirds of an utterance, as well as for the utterance as a whole, to generate multiple sets of data for each utterance.

20 Claims, 2 Drawing Sheets

OTHER PUBLICATIONS

"Affective Computing", Affective Computing Research Group at the MIT Media Lab; Oct. 25, 1996, pp. 1–38.

"Cross–Validation and Other Estimates of Prediction Error"; Chapter 17, pp. 237–257.

Agranovski, A.V. et al, "The Research of Correlation Between Pitch and Skin Galvanic Reaction at Change of Human Emotional State"; Eurospeech '97; Spetsvuzavtomatika Design Burear, 51 Gazetny St., Rostov–on–Don, Russia. pp. 1–4.

Bachorowski, Jo–Anne et al, "Vocal Expression of Emotion: Acoustic Properties of Speech Are Associated With Emotional Intensity and Context"; American Psychological Society, vol. 6, No. 4, Jul. 1995, pp. 219–224.

Cahn, Janet E., "An Investigation into the Correlation of Cue Phrases, Unfilled Pauses and the Structuring of Spoken Discourse", Media Laboratory, Massachusetts Institute of Technology, Cambridge, MA 02139, pp. 1–12.

Cahn, Janet E., "The Generation of Affect in Synthesized Speech", Journal of the American Voice I/O Society, Jul. 1990, vol. 8, pp. 1–19.

Cummings, Kathleen E. et al, "Analysis of Glottal Waveforms Across Stress Styles"; School of Electrical Engineering, Georgia Institute of Technology, Atlanta, Georgia 30332–0250; pp. 369–372, Apr. 3–6, 1990.

Efron, Bradley et al, "A Leisurely Look at the Bootstrap, the Jackknife, and Cross–Validation", The American Statistician, Feb. 1983, vol. 37, No. 1, pp. 36–48.

Efron, Bradley et al, "Improvements on Cross–Validation: The .632+ Bootstrap Method", The American Statistician, Jun. 1997, vol. 92, No. 438, pp. 548–560.

Engberg, Inger S. et al., "Design, Recording and Verification of a Danish Emotional Speech Database"; Eurospeech '97; Center for PersonKommunikation, Aalborg University, Frederik Bajers Veh7 A2, 9220 Aalborg Ost, Denmark, pp. 1–4.

Fernald, Anne, "Human Maternal Vocalizations to Infants as Biologically Relevant Signals: An Evolutionary Perspective", Parental Care and Children, pp. 391–428.

Fernald, Anne, "Intonation and Communicative Intent in Mothers' Speech to Infants: Is the Melody the Message?", Stanford University, pp. 1497–1510.

Huron, David, "Sound, Music and Emotion: A Tutorial Survey of Research".

Jansens, Susan et al; "Perception and Acoustics of Emotions in Singing"; Computer and Humanities Department, Utrecht Institute of Linguistics–OTS, University of Utrecht, Trans 10, 3512 JK Utrecht, the Netherlands, pp. 1–4.

Lipscomb, Scott D. et al, "Perceptual Judgement of the Relationship Between Musical and Visual Components in Film"; Psychomusicology, Spring/Fall 1994, pp. 60–98.

McRoberts, Gerald W. et al, "An Acoustic Study of Prosodic Form–Function Relations in Infant–Directed Speech: Cross Language Similarities"; In Press: Developmental Psychology, Form–Function Relations; pp. 1–14.

Noad, J.E.H. et al, "A Macroscopic Analysis of an Emotional Speech Corpus"; Eurospeech '97, Department of Human Communication Sciences and Department of Computer Science, University of Sheffield, S10 2TN, England, pp. 1–4.

Papousek, Mechthild et al; "The Meanings of Melodies in Motherese in Tone and Stress Languages"; Infant Behavior and Development 14, 415–440 (1991).

Picard, R.W., "Affective Computing"; M.I.T. Media Laboratory Perceptual Computing Section Technical Report No. 321, Revised Nov. 26, 1995; pp. 1–23, 25.

Pittam, Jeffery et al, "Vocal Expression and Communication of Emotion"; Handbook of Emotions, Biological and Neurophysiological Approaches, pp. 185–197.

Scherer, Klaus R. et al, "Cue Utilization in Emotion Attribution from Auditory Stimuli"; Motivation and Emotion, vol. 1, No. 4, 1977, pp. 331–346.

Scherer, Klaus R., "Vocal Affect Expression: A Review and a Model for Future Reseach"; Psychological Bulletin, 1986, vol. 99, No. 2, pp. 143–165.

Stern, Daniel N. et al; "Intonation Contours as Signals in Maternal Speech to Prelinguistic Infants"; Developmental Psychology 1982, vol. 18, No. 5, pp. 727–735.

Streeter, L.A. et al, "Acoustic and Perceptual Indicators of Emotional Stress"; J. Accous. Soc. Am. 73 (4), Apr. 1983, pp. 1354–1360.

Talkin, David, "A Robust Algorithm for Pitch Tracking (RAPT)", Speech Coding and Synthesis, Chapter 14, 1995, pp. 495–518.

Tosa, Naoko et al, "Network Neuro–Baby"; ATR Media Integration & Communications Research Laboratories, 2–2 Hikaridai Seika–cho Soraku–gun, Kyoto 619–02, JAPAN. pp. 1–4.

Williams, Carl E. et al, "Emotions and Speech: Some Acoustical Correlates"; The Journal of the Acoustical Society of America, vol. 52, No. 4 (Part 2), 1972, pp. 1238–1250.

* cited by examiner

SYSTEM AND METHOD FOR AUTOMATIC CLASSIFICATION OF SPEECH BASED UPON AFFECTIVE CONTENT

REFERENCE TO PRIOR APPLICATION

Benefit of the earlier filing date of Provisional Application Ser. No. 60/063,705, filed Oct. 29, 1997, is hereby claimed.

FIELD OF THE INVENTION

The present invention is generally directed to the field of affective computing, and more particularly concerned with the automatic classification of speech signals on the basis of prosodic information contained therein.

BACKGROUND OF THE INVENTION

Much of the work that has been done to date in connection with the analysis of speech signals has concentrated on the recognition of the linguistic content of spoken words, i.e., what was said by the speaker. In addition, some efforts have been directed to automatic speaker identification, to determine who said the words that are being analyzed. However, the automatic analysis of prosodic information conveyed by speech has largely been ignored. In essence, prosody represents all of the information in a speech signal other than the linguistic information conveyed by the words, including such factors as its duration, loudness, pitch and the like. These types of features provide an indication of how the words were spoken, and thus contain information about the emotional state of the speaker.

Since the affective content of the message is conveyed by the prosody, it is independent of language. In the field of affective computing, therefore, automatic recognition of prosody can be used to provide a universal interactive interface with a speaker. For example, detection of the prosody in speech provides an indication of the "mood" of the speaker, and can be used to adjust colors and images in a graphical user interface. In another application, it can be used to provide interactive feedback during the play of a video game, or the like. As other examples, task-based applications such as teaching programs can employ information about a user to adjust the pace of the task. Thus, if a student expresses frustration, the lesson can be switched to less-demanding concepts, whereas if the student is bored, a humorous element can be inserted. For further information regarding the field of affective computing, and the possible applications of the prosodic information provided by the present invention, reference is made to *Affective Computing* by R. W. Picard, MIT Press, 1997.

Accordingly, it is desirable to provide a system which is capable of automatically classifying the prosodic information in speech signals, to detect the emotional state of the speaker. In the past, systems have been developed which classify the spoken affect in speech, which are based primarily upon analysis of the pitch content of speech signals. See, for example, Roy et al, "Automatic Spoken Affect Classification and Analysis", *IEEE Face and Gesture Conference*, Killington, Vt., pages 363–367, 1996.

SUMMARY OF THE INVENTION

The present invention is directed to a method and system for classifying speech according to emotional content, which employs acoustic measures in addition to pitch as classification input, in an effort to increase the accuracy of classification. In a preferred embodiment of the invention, two different kinds of features in a speech signal are analyzed for classification purposes. One set of features is based on pitch information that is obtained from a speech signal, and the other set of features is based on changes in the spectral shape of the speech signal. Generally speaking, the overall spectral shape of the speech signal can be used to distinguish long, smoothly varying sounds from quickly changing sound, which may indicate the emotional state of the speaker. Different variations of pitch and spectral shape features can be measured and analyzed, to assist in the classification of portions of speech, such as individual utterances.

In a further preferred embodiment, each selected portion of the speech is divided into three segments for analysis, namely the first, middle and last third of a sound. Each of these three segments is analyzed with respect to the various feature parameters of interest. In addition, the total duration of an utterance can be analyzed with respect to each parameter of interest, to provide various global measures. A subset of these measures is then employed for classification purposes.

Further aspects of the invention are described hereinafter in greater detail, with reference to various embodiments illustrated in the accompanying drawings.

DETAILED DESCRIPTION

Figure 1:
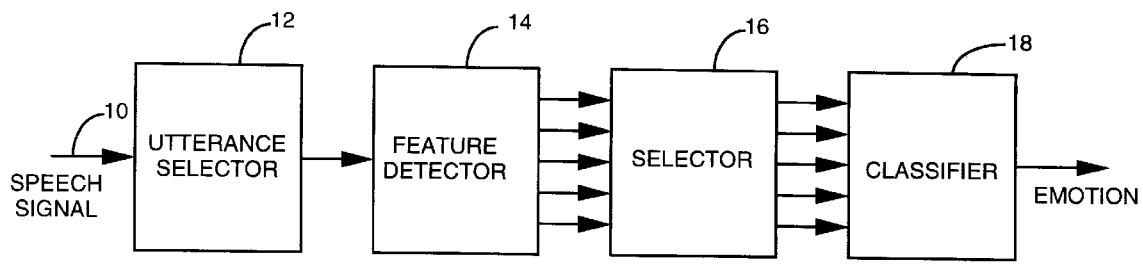
FIG. 1 is a general block diagram of an emotional state discriminator embodying the present invention.
Figure 2:
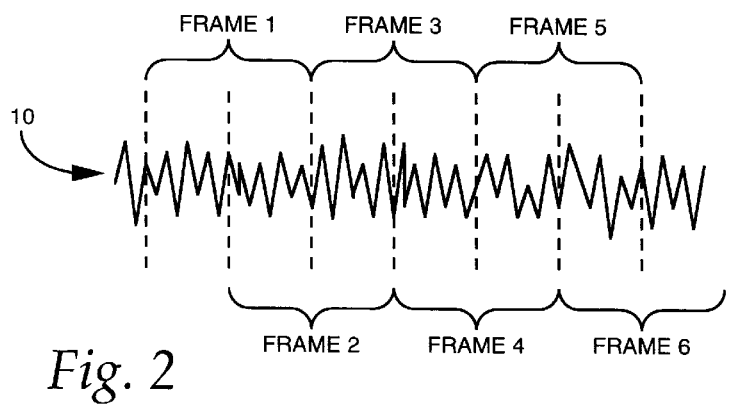
FIG. 2 is an illustration of an audio signal that has been divided into frames.

The general construction of an audio emotion classifier in accordance with the present invention is illustrated in the block diagram of FIG. 1. A speech signal 10 to be classified is fed to a selector 12, which extracts a portion of the speech signal to be analyzed. In one embodiment of the invention, individual utterances by the speaker can be selected. If the speech signal is in an analog form, such as the output signal from a microphone, it is first converted into a digital format. The selector 12 identifies one portion of the input signal, e.g. one of the spoken words, and forwards it on to a feature detector 14. Within the feature detector, the digital signal for the selected sound(s) is analyzed to measure various quantifiable components that characterize the signal. These individual components, or features, are described in detail hereinafter. Preferably, the speech signal is analyzed on a frame-by-frame basis. Referring to FIG. 2, for example, a speech signal 10 is divided into a plurality of overlapping frames. In one embodiment, each frame might have a total length of about 40 milliseconds, and adjacent frames overlap one another by one half of a frame, e.g., 20 milliseconds. Each feature is measured over the duration of each full frame. In addition, for some of the features, the variations of those features' values over successive frames are determined.

After the values for all of the features have been determined for a given frame, or series of frames, they are presented to a feature selector 16. Depending upon the manner in which the speech is to be classified, or characteristics of the speaker, e.g. male vs. female, certain combinations of features may provide more accurate results than others. Therefore, rather than classify the speech on the basis of all of the measured features, it may be desirable to utilize a subset of those features which provides the best results. Furthermore, reducing the total number of features that are analyzed permits a reduction in the amount of data to be interpreted, thereby increasing the speed of the classification process. The best set of features to employ is empirically determined for a given situation and set of classes.

The data for the appropriately selected features is provided to a classifier 18. Depending upon the number of features that are employed, as well as the particular features themselves, some types of classifiers may provide better results than others. For example, a Gaussian classifier, a nearest-neighbor classifier or a neural network might be used for different sets of features. Conversely, if a particular classifier is preferred, the set of features which function best with that classifier can be selected in the feature selector 16. The classifier 18 evaluates the data from the various features, and provides an output signal which labels the selected utterance from the input speech signal 10 as being associated with a particular emotional characteristic. For example, in one embodiment of the invention for classifying a parent's communication with an infant, each utterance can be labeled as belonging to one of three classes, namely approval, attention or prohibition.

For ease of understanding, the selector 12, the feature detector 14, the selector 16 and the classifier 18 are illustrated in FIG. 1 as separate components. In practice, some or all of these components can be implemented in a computer which is suitably programmed to carry out their respective functions.

Figure 3:
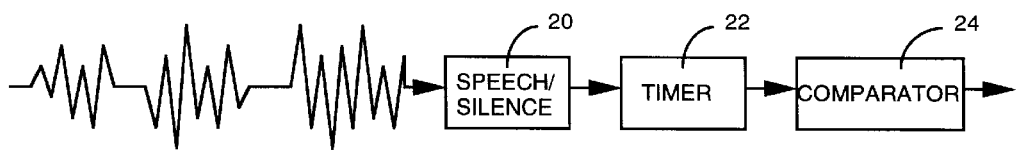
FIG. 3 is a more detailed block diagram of the utterance selector.

The operation of an utterance selector is schematically depicted in the block diagram of FIG. 3. The input speech signal 10, which might consist of a string of several words, is first analyzed in a speech/silence discriminator 20. This discriminator detects instances of silence in the input signal, to segment the signal into individual utterances at phrase boundaries. Generally speaking, each utterance comprises a single word. For further information regarding a suitable speech/silence discriminator, reference is made to Lamel et al., "An Improved Endpoint Detector for Isolated Word Recognition", *IEEE Transactions on ASSP.*, Vol. ASSP-29. pp. 777–785, August 1981, the disclosure of which is incorporated by reference herein. A timer 22 measures the duration of each segmented utterance, and the longest utterance in a phrase is selected by a comparator 24, to be passed on to the feature detector.

Figure 4:
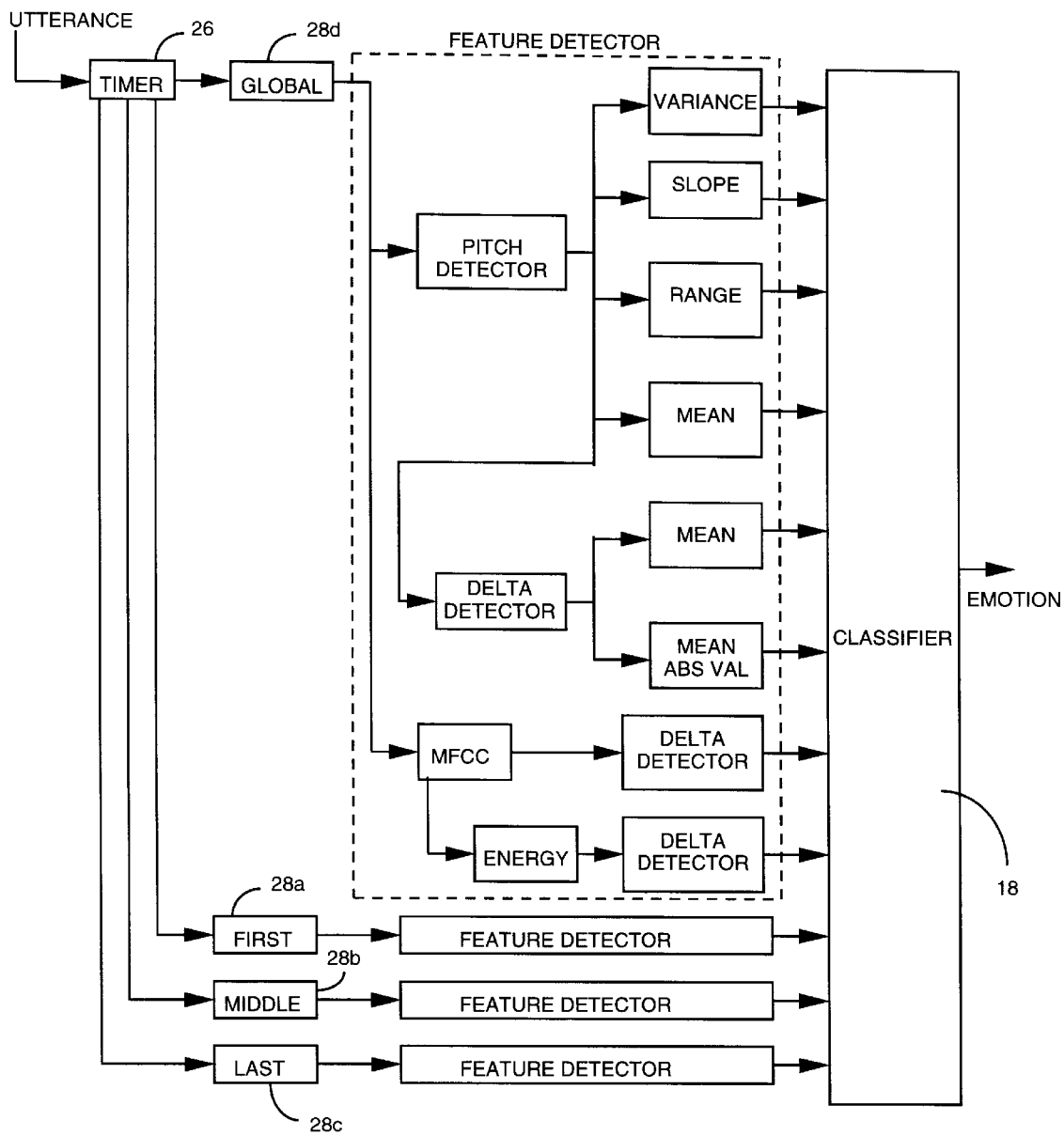
FIG. 4 is a more detailed block diagram of the feature detector.

The feature detector is schematically illustrated in the block diagram of FIG. 4. As a first step, each selected utterance is divided into three segments of approximately equal duration by a timer 26, and the frames pertaining to each segment are stored in an associated buffer 28a, 28b, 28c for analysis. In addition, the entire utterance is also stored in a buffer 28d, to provide a global measure of the features over the entire utterance. Each of these four sets of data, i.e., the individual thirds of the utterance and the total utterance, is then separately analyzed to measure the features of interest. Thus, for each feature, four measurements are obtained over different time periods. In the block diagram of FIG. 4, the details of the analysis of the total utterance is illustrated. The same type of analysis is carried out with respect to each of the other three sets of data. In the interest of clarity, the analysis of the other three sets of data is not illustrated, since it is the same as that carried out with respect to the total utterance.

In some situations, the nature of the speech may be such that it is difficult to divide into discrete utterances, which can then be split into three segments. In this case, it may be preferable to use only the global measures to classify the speech.

In general, the speech signals are analyzed with respect to two primary types of features, one of which is based on the pitch of the speech and the other of which is based on its spectral envelope. The pitch of each utterance can be analyzed in any one of a number of well known manners. For further information regarding the analysis of speech to detect pitch, see *Digital Processing of Speech Signals*, by L. R. Rabiner and R. W. Schafer, Prentice Hall, 1978. A suitable dynamic programming algorithm for detecting pitch is also disclosed in Talkin, D., "A Robust Algorithm for Pitch Tracking (RAPT)", *Speech Coding and Synthesis*, Kleign & Palival eds, Elsevier Science, Amsterdam, pp. 495–518, 1995. The analysis produces an estimate of the speech signal's pitch, measured in Hertz. To condense the pitch estimate into octaves, the base 2 log of the measured frequency value can be computed. Various statistics of the pitch information, which correspond to different features of the speech signal, are then measured. In the illustrated embodiment, these features include the variance of the pitch, the slope of the pitch, the range of the pitch, and the mean pitch. These values are computed over all of the frames of the utterance, or segment of interest. In addition, the change in pitch from frame to frame, i.e., the delta pitch, can be measured and two additional features computed therefrom, namely the mean delta pitch and the mean of the absolute delta pitch. Thus, for each utterance, or segment thereof, six features based upon pitch are measured.

Figure 5:
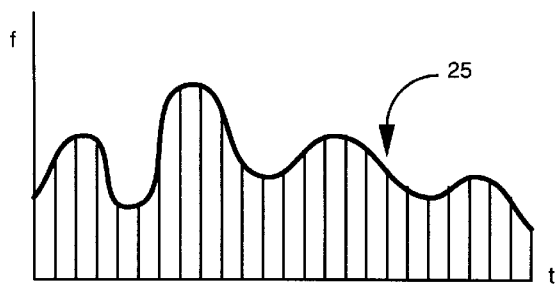
FIG. 5 is an illustration of the spectral envelope of a sound.

The other type of information is based upon transitions in the spectral envelope of the speech signal. FIG. 5 is a schematic illustration of a spectral slice for one frame of a sound. The vertical lines depict the characteristic frequency or pitch harmonics of the sound over time. The spectral envelope for this frame is depicted by the line 25, and is representative of the articulatory shape of the speaker's vocal tract as the sound is being produced. A low-dimensional representation of the speech signal is used to determine its spectral envelope. In one embodiment of the invention, mel-frequency cepstral coefficients (MFCC) are used to provide such a representation of the spectral shape of the speech signal. For further information relating to the determination of an MFCC, reference is made to Hunt et al, "Experiments in Syllable-based Recognition of Continuous Speech", *Proceedings of the 1980 ICASSP*, Denver Colo., pp 880–883, the disclosure of which is incorporated herein by reference. Generally speaking, MFCC analysis results in a set of coefficients, or parameters, which are typically employed in speech recognition as a simple measure of what is being said. In the context of the present invention, the speed with which these parameters change is measured, as an indicator of the manner in which the words are spoken. Thus, in the illustrated embodiment, the delta MFCC is measured from frame to frame. The entire utterance can be measured by its mean frame-by-frame change in the MFCC parameter. As an alternative to using an MFCC analysis, other techniques for providing a low-dimensional representation of the sound, such as linear predictive coding (LPC) can be employed.

Of course, additional features, such as energy variance, can also be measured to enhance the classification process. In the embodiment depicted in FIG. 4, for example, the variance in energy from frame to frame is measured, and provided as an input to the classifier. A measure of the sound's energy can be obtained from the first component, i.e. the C0 coefficient, of the MFCC. The use of such additional features may be particularly helpful in those situations where only the global measurements are employed for analysis.

In the foregoing example, eight features are measured for each of the four components of a selected utterance, resulting in thirty-two feature values for each utterance. These measured features are summarized in Table 1 below.

TABLE 1

| 1  | First third  | Variance of the pitch |
| 2  | Middle third | Variance of the pitch |
| 3  | Final third  | Variance of the pitch |
| 4  | Global       | Variance of the pitch |
| 5  | First third  | Slope of the pitch    |
| 6  | Middle third | Slope of the pitch    |
| 7  | Final third  | Slope of the pitch    |
| 8  | Global       | Slope of the pitch    |
| 9  | First third  | Range of the pitch    |
| 10 | Middle third | Range of the pitch    |
| 11 | Final third  | Range of the pitch    |
| 12 | Global       | Range of the pitch    |
| 13 | First third  | Mean of the pitch     |
| 14 | Middle third | Mean of the pitch     |
| 15 | Final third  | Mean of the pitch     |
| 16 | Global       | Mean of the pitch     |
| 17 | First third  | Mean of the pitch     |
| 18 | Middle third | Mean Delta Pitch      |
| 19 | Final Third  | Mean Delta Pitch      |
| 20 | Global       | Mean Delta Pitch      |
| 21 | First third  | Mean Absolute Value Delta Pitch |
| 22 | Middle third | Mean Absolute Value Delta Pitch |
| 23 | Final third  | Mean Absolute Value Delta Pitch |
| 24 | Global       | Mean Absolute Value Delta Pitch |
| 25 | First third  | Delta MFCC            |
| 26 | Middle third | Delta MFCC            |
| 27 | Final third  | Delta MFCC            |
| 28 | Global       | Delta MFCC            |
| 29 | First third  | Energy Variance       |
| 30 | Middle third | Energy Variance       |
| 31 | Final third  | Energy Variance       |
| 32 | Global       | Energy VarianceMarch 19, 1994 |

All of these measured feature values, or preferably some subset thereof, are provided to the classifier 18. In one embodiment of the invention, the classifier can be implemented by means of a multi-dimensional discriminator which functions to label each utterance according to the proper class. For example, a Gaussian mixture model can be employed to model each class of data. In operation, the classifier is first trained by using measured features from a set of utterances which have been labelled in accordance with predefined classes of emotion, such as the previously mentioned categories "approval", "attention" and "prohibition" relating to parent-child interaction. Thereafter, the measured features for unlabelled utterances are fed to the classifier, to determine which one of these classes each utterance belongs to.

In one implementation of the invention, an "optimal" classifier can be built, using a selective process. As an initial step, a Gaussian mixture model can be trained for each separate feature. The feature which provides the best classification results is chosen as the first feature in the optimal set. In a specific example based upon the three classes defined above, the delta MFCC parameters, which measure the speed at which the sounds are changing, provided the best results. In subsequent iterations, three Gaussian mixture models were trained, one for each class, based upon the current set and each remaining feature. The feature that resulted in the best performance was added to the set. Using this approach, it is possible to find an approximation of the N best features for determining the classification of utterances, i.e. those which add the most information to the decision-making process. The results of such an approach for the example described above are illustrated in Table 2 below. This particular example relates to a test in which input data from speakers of both genders was employed, and was selectively filtered to use only those utterances which were strong enough to be conclusively labelled by human listeners as falling into one of the three designated classes. In the table, each row represents one iteration of the process. The first column identifies the features of the set for that iteration, and the last column designates the new feature which was added to the set during that iteration. The middle column, labeled "performance", identifies the percentage of unknown samples which were correctly labeled by the classifier, using that set of features. Thus, as shown in the last row of the table, the feature set comprised of the seven best features provides proper classification of about 64% of the tested samples.

TABLE 2

| Features | Performance | Added Feature |
| --- | --- | --- |
| 26 | 0.5 +/− 0.164111 | Middle third, Delta MFCC |
| 26 12 | 0.570312 +/− 0.107239 | Global, Pitch Range |
| 26 12 27 | 0.621875 +/− 0.0791219 | Final third, Delta MFCC |
| 26 12 27 7 | 0.632812 +/− 0.0716027 | Final third, Pitch Slope |
| 26 12 27 7 20 | 0.63125 +/− 0.100164 | Global, Mean Delta Pitch |
| 26 12 27 7 20 25 | 0.626563 +/− 0.100612 | First third, Delta MFCC |
| 26 12 27 7 20 25 11 | 0.640625 +/− 0.0660971 | Final third, Pitch Range |

From the foregoing, it can be seen that the present invention provides a classifier which permits an utterance to be labeled in accordance with a set of predefined classes of emotional state, based upon the prosody of the utterance. This information can be used to provide interactive feedback to a user in a variety of different manners. In one implementation, for example, detection of the emotional state of the speaker can be employed to adjust colors in a graphical user interface for a computer. If the speaker exhibits an unhappy state, it might be preferable to adjust the colors of the display so that they are brighter or livelier. In another implementation, an image of a character in a game can be displayed with different expressions on its face, to match the detected state of one of the players in the game. In yet another application, the classifier might be used to detect the speaker's mood, which could then be reflected by changing the color of jewelry or some other apparel worn by the speaker.

It will be appreciated by those of ordinary skill in the art that the present invention can be embodied in other specific forms without departing from the spirit or essential characteristics thereof. For instance, features in addition to those explicitly mentioned herein can also be employed as factors in the classification of the speech signals. The presently disclosed embodiment is considered in all respects to be illustrative, and not restrictive.

What is claimed is:

1. A method for classifying the affective content of speech, comprising the steps of:

analyzing a portion of a speech signal to determine values for features of said portion of the speech signal which are based upon the pitch of the speech signal;

analyzing said portion of the speech signal to determine the mel-frequency cepstral coefficients for the speech signal, and measuring the difference in said coefficients from frame to frame of said portion of the speech signal to determine changes in the spectral envelope of the speech signal over time;

providing said pitch-based feature values and said changes in the spectral envelope to a classifier; and labelling said portion of the speech signal as belonging to one of a predetermined set of classes of affective content for which said classifier has been trained.

2. The method of claim 1 wherein said changes in the spectral envelope include frame-to-frame change in spectral shape over said portion of the speech signal.

3. The method of claim 1 wherein said pitch-based feature values include statistics relating to the magnitude of pitch in said portion of the speech signal.

4. The method of claim 1 wherein said pitch-based feature values include both the frame-to-frame change in pitch over said portion of the speech signal and statistics relating to the magnitude of pitch in said portion of the speech signal.

5. The method of claim 1 wherein said portion of the speech signal comprises a single utterance.

6. The method of claim 1 wherein said portion of the speech signal comprises a single utterance, and further including the steps of dividing each utterance into multiple segments, and performing said analyzing steps for individual ones of said segments.

7. The method of claim 6 wherein said analyzing steps are also performed globally over the entirety of each utterance.

8. The method of claim 6 wherein said segments comprise the first, middle and last thirds of an utterance.

9. The method of claim 1 further including the steps of analyzing said portion of the speech signal to determine values for a third feature of said portion of the speech signal which is based upon the characteristics of the speech signal other than its pitch and its spectral envelope, and providing said third feature values to said classifier in addition to said pitch-based feature values and said changes in the spectral envelope for labelling the affective content of said portion of the speech signal.

10. The method of claim 9 wherein said third feature is the energy of the speech signal.

11. The method of claim 1 wherein said spectral envelope is measured by determining a low-dimensional representation of the speech signal.

12. The method of claim 11 wherein said low-dimensional representation comprises the mel-frequency cepstral coefficients for the speech signal.

13. The method of claim 11 wherein said low-dimensional representation is determined from a linear predictive analysis of the speech signal.

14. A method for classifying the affective content of speech, comprising the steps of:

analyzing a portion of a speech signal to determine the mel-frequency cepstral coefficients for the speech signal, and measuring the difference in said coefficients from frame to frame of said portion of the speech signal to determine changes in the spectral envelope of the speech signal over time;

analyzing said portion of the speech signal to determine values for other features of said portion of the speech signal which are based upon the characteristics of the speech signal other than its spectral envelope;

providing said changes in the spectral envelope and said values of the other features to a classifier; and labelling said portion of the speech signal as belonging to one of a predetermined set of classes of affective content for which said classifier has been trained.

15. The method of claim 14 wherein said changes in the spectral envelope include frame-to-frame change in spectral shape over said portion of the speech signal.

16. A method for classifying the affective content of speech, comprising the steps of:

analyzing a portion of a speech signal to determine values for multiple features of said portion of the speech signal which are based upon the pitch of the speech signal;

analyzing said portion of the speech signal to determine the mel-frequency cepstral coefficients for the speech signal, and measuring the difference in said coefficients from frame to frame of said portion of the speech signal to determine changes in the spectral envelope of the speech signal over time;

providing said values of the pitch-based features and said envelope changes to a classifier; and labelling said portion of the speech signal as belonging to one of a predetermined set of classes of affective content for which said classifier has been trained.

17. A system for classifying speech according to its affective content, comprising:

a pitch analyzer which determines values for features of a portion of a speech signal which are based upon the pitch of the speech signal;

a spectral shape analyzer which determines the mel-frequency cepstral coefficients for the speech signal, and measures the difference in said coefficients from frame to frame of said portion of the speech signal to determine changes in the spectral envelope of the speech signal over time; and a classifier which receives said pitch-based feature values and said changes in the spectral envelope, and labels said portion of the speech signal as belonging to one of a predetermined set of classes of affective content for which said classifier has been trained.

18. The system of claim 17 wherein said changes in the spectral envelope include frame-to-frame change in spectral shape over said portion of the speech signal.

19. A system for classifying speech according to its affective content, comprising:

a spectral shape analyzer which determines the mel-frequency cepstral coefficients for the speech signal, and measures the difference in said coefficients from frame to frame of the speech signal to determine changes in the spectral envelope of a speech signal over time;

a second analyzer which determines values for other features of the speech signal which are based upon the characteristics of the speech signal other than its spectral envelope; and a classifier which labels the speech signal as belonging to one of a predetermined set of classes of affective content in accordance with said changes in spectral envelope and said other feature values.

20. A system for classifying speech according to its affective content, comprising:

a pitch analyzer which determines values for multiple features of a speech signal which are based upon the pitch of the speech signal;

a spectral shape analyzer which determines the mel-frequency cepstral coefficients for the speech signal, and measures the difference in said coefficients from frame to frame of the speech signal to determine changes in the spectral envelope of the speech signal over time; and a classifier which labels speech signal as belonging to one of a predetermined set of classes of affective content in accordance with said pitch-based feature values and said spectral envelope changes.

* * * * *